P. J. PAQUET.
DRAWING BAIT FOR WINDOW GLASS MACHINERY.
APPLICATION FILED AUG. 3, 1915.
1,168,960.
Patented Jan. 18, 1916.
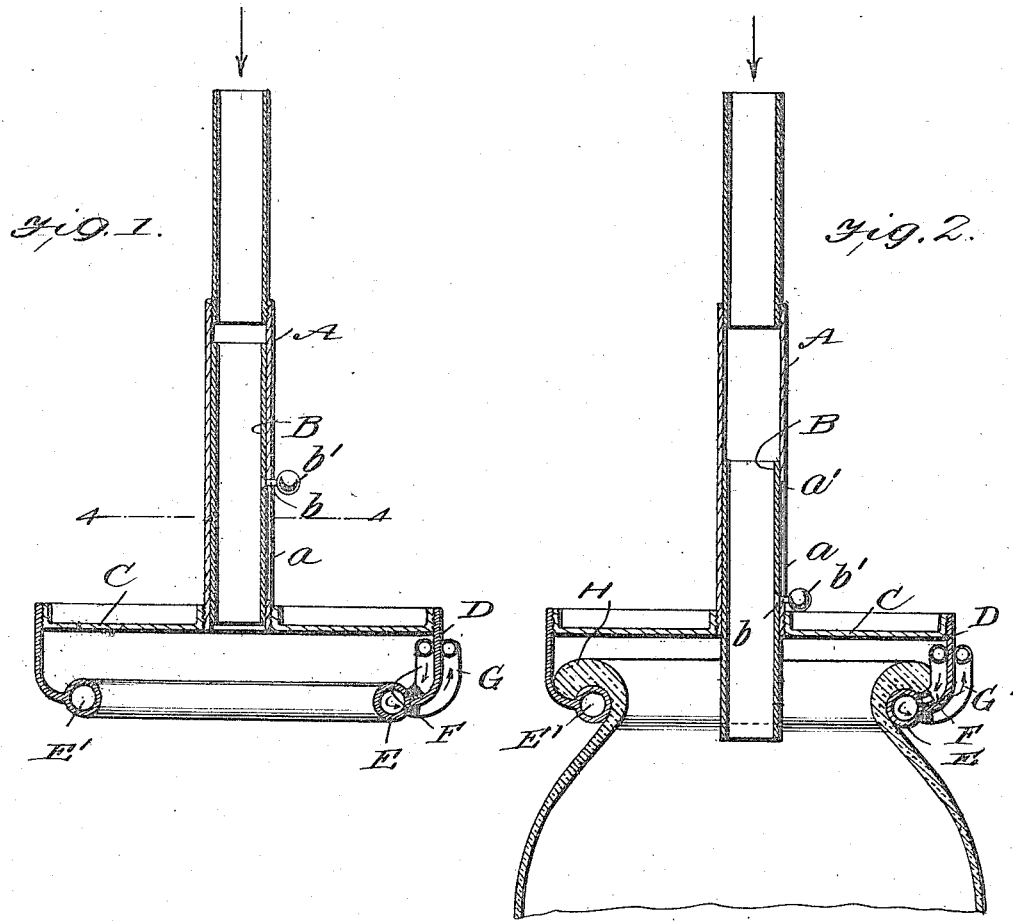
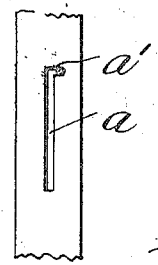
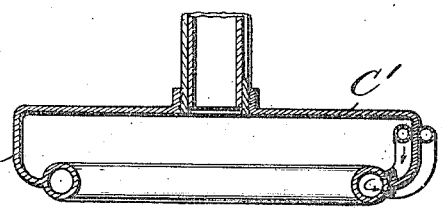
WITNESSES:
F. C. Barry
Myron G. Clear
INVENTOR
Pierre J. Paquet
BY Munn & Co.
ATTORNEYS

UNITED STATES PATENT OFFICE.

PIERRE J. PAQUET, OF JEANNETTE, PENNSYLVANIA.

DRAWING-BAIT FOR WINDOW-GLASS MACHINERY.

1,168,960.     Specification of Letters Patent.     Patented Jan. 18, 1916.

Application filed August 3, 1915. Serial No. 43,383.

*To all whom it may concern:*

Be it known that I, PIERRE J. PAQUET, a citizen of the United States, and a resident of Jeannette, in the county of Westmoreland and State of Pennsylvania, have invented certain new and useful Improvements in Drawing-Bait for Window-Glass Machinery, of which the following is a specification.

My present invention relates generally to window glass machinery, and more particularly to what is known as a cold bait, that part of the machinery which is lowered into the molten glass and which thereafter, during the blowing of the glass, forms the head of the cylinder, and communicates with the interior of such cylinder so as to provide for the introduction of air to the cylinder continuously during the blowing operation.

Cold baits, the nature of which may be generally understood from the above, are now constituted by a substantially circular body plate having a central aperture from which rises a pipe, the upper end of which pipe connects with the air supply pipe of the drawing machinery when the bait is disposed in operative position upon the vertically movable cage which forms part of such drawing machinery. From the edge of this plate a flange depends, the lower end of such flange being inwardly inclined and having a surrounding inwardly projecting bead forming a collecting ring, on which the collar at the extreme upper end of the cylinder is formed when the bait is lowered into and drawn out of the molten glass. These baits are open to the serious objection, however, of sudden unequal cooling and consequent contraction after more or less expansion when lowered into the hot glass, and it is the primary object of my invention therefore to provide improvements remedying these objections and obviating the disadvantages resulting therefrom such as frequent checking of the glass and not infrequent loss of an entire cylinder. The means employed by me for this purpose will be now described with reference to the accompanying drawings, which form a part of this specification, and in which—

Figure 1 is a vertical substantially central section taken through the cold bait constituting my invention, showing the parts in the position they will assume when the bait is initially lowered into the molten glass. Fig. 2 is a similar view illustrating the bait and the upper or head end of a cylinder drawn thereby, illustrating the parts in the position they will assume when the bait has been drawn above the level of the molten glass. Fig. 3 is a side elevation of a fragmentary lower portion of the bait pipe. Fig. 4 is a transverse section therethrough taken substantially on line 4—4 of Fig. 1. Fig. 5 is a view similar to Fig. 1, with the upper portion of the bait pipe broken away, and illustrating a slightly modified form of body of the bait itself.

Referring now to these figures, my invention contemplates providing the bait pipe A with an internal vertically adjustable tube B, and with a vertically disposed slot $a$ adjacent its lower end, at which point it is connected to the circular plate C of the bait, the upper end of which vertically disposed slot $a$ is provided with an angular extension slot $a'$, forming substantially what is known as a bayonet slot, and receiving an outwardly projecting stud $b$, the inner end of which is rigidly connected to the inner tube B just before mentioned. This stud may have a handle $b'$ by which it may be readily manipulated and adjusted to the upper and lower positions respectively shown in Figs. 1 and 2.

In the upper position of the inner adjustable tube B, the bait is ready to be lowered into the molten glass, and as soon as the collar has formed around the collecting ring of the bait to be hereinafter mentioned, and the bait itself is above the level of the molten glass, the inner tube B is lowered in order that the relatively cool air entering through the bait pipe A will be directed into the cylinder being formed at a point below the level of the collar of the cylinder as will be plainly seen by reference to Fig. 2.

In addition to the circular plate C, through which the lower end of the bait pipe A communicates, the bait includes a surrounding flange D, depending from the outer edge of the plate C and either formed detachable in connection therewith as illustrated in Figs. 1 and 2, or integral as shown in Fig. 5, in which latter figure the circular plate forming the body of the bait is indicated at C' and the flange is indicated at D'. In either form, however, the lower inwardly inclined edge of the flange of the bait is provided with a collecting ring indicated at E, and in accordance with my invention this collecting ring is formed hollow, its bore E' providing an annular space in which heated air may circulate and thus maintain the collecting ring at substantially a uniform temperature throughout the operation. The flange D is also provided with inner and outer nipples F and G respectively, the upper ends of which are open and the lower ends of which communicate with the space E' of the hollow collecting ring E, so as to create a circulation of the inner heated air of the bait through its hollow ring E and out through the exterior nipple G. In this way the temperature of the collecting ring, and the adjacent parts of the bait to which the collar of the cylinder adheres, may be kept substantially uniform throughout the drawing operation, and sudden and unequal chilling effectively prevented, particularly in view of the adjustable tube B which when lowered to the position shown in Fig. 2 effectively prevents contact of the incoming somewhat cool air through the bait pipe A with the collar of the cylinder indicated at H in Fig. 2.

I claim:—

1. A drawing bait for window glass machinery having a lower collecting ring and an upper pipe, and a vertically adjustable interior tube within and carried by said pipe and having a limited movement with respect thereto, which tube, when in lowered position, protects the collecting ring from direct action of air from the lower end of the said pipe.

2. A drawing bait for window glass machinery having a lower collecting ring, and an upper pipe provided with a vertically adjustable interior tube which, when in lowered position, protects the collecting ring from direct action of air from the lower end of the said pipe, and coöperating means carried by said pipe and said tube for supporting said tube in upper and lower positions.

3. A drawing bait for window glass machinery having a lower collecting ring and an upper pipe provided with a vertically adjustable interior tube which, when in lowered position, protects the collecting ring from direct action of air from the lower end of the said pipe, said pipe having a bayonet slot and said tube having a stud projecting exteriorly through said pipe slot whereby to support the tube in upper and lower positions.

4. A drawing bait for window glass machinery having a hollow lower collecting ring, the space within which communicates with both the interior and exterior of the bait.

5. A drawing bait for window glass machinery having a hollow lower collecting ring, and a nipple communicating with the hollow of the ring and the interior of the bait above the ring.

6. A drawing bait for window glass machinery having a hollow lower collecting ring, and having inner and outer nipples, the upper ends of which are open at points above the said collecting ring, and the lower ends of which are in communication with the space within the collecting ring.

7. A drawing bait for window glass machinery having a lower collecting ring and an upper pipe, and a tube carried by, and within the lower portion of, said pipe and having limited movement with respect thereto and in the direction of its length to maintain its lower end at points above and below the said collecting ring.

PIERRE J. PAQUET.

Witnesses:
T. F. O'CONNELL,
HENRY BOZZAN.

Copies of this patent may be obtained for five cents each, by addressing the "Commissioner of Patents, Washington, D. C."